May 20, 1930.  R. E. BISSELL  1,759,603
METHOD OF HEAT TREATMENT
Filed Aug. 2, 1926
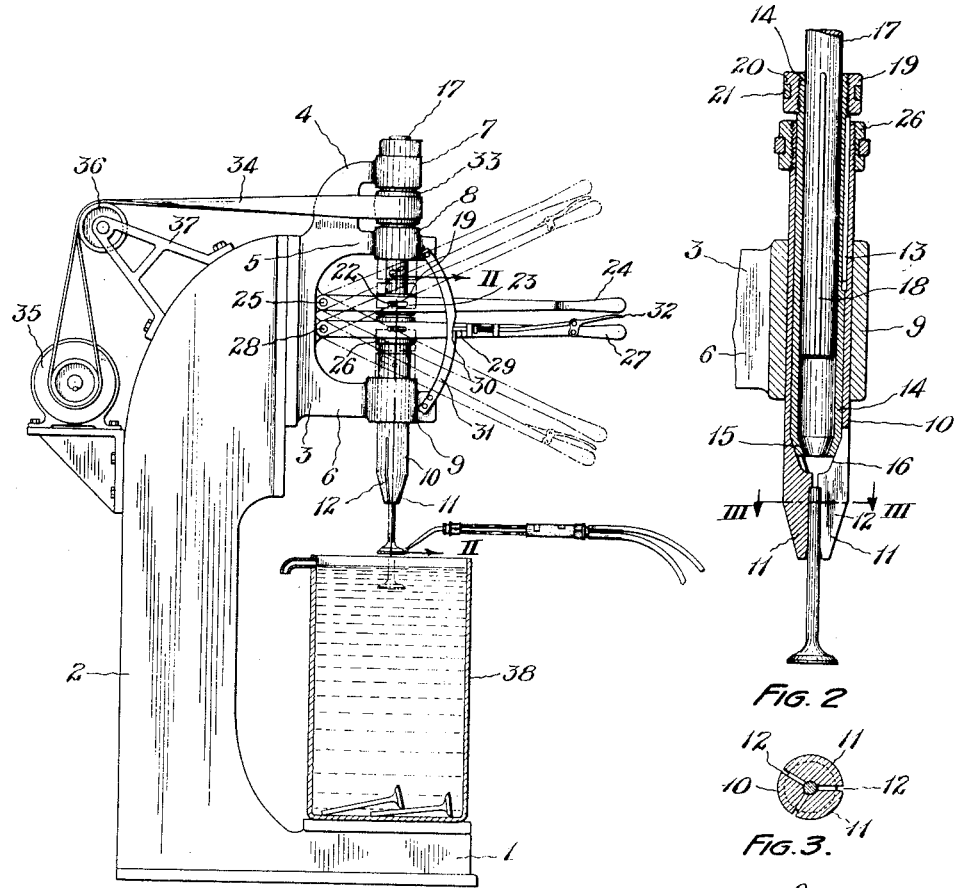
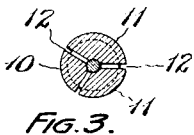
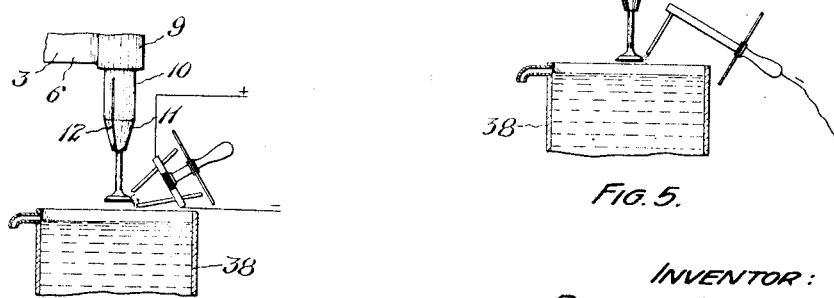
INVENTOR:
RICHARD E. BISSELL
BY
ATTORNEY.

Patented May 20, 1930

1,759,603

UNITED STATES PATENT OFFICE

RICHARD E. BISSELL, OF CLEVELAND HEIGHTS, OHIO, ASSIGNOR TO THOMPSON PRODUCTS INC., OF CLEVELAND, OHIO, A CORPORATION OF OHIO

METHOD OF HEAT TREATMENT

Application filed August 2, 1926. Serial No. 126,351.

The invention relates to heat treatment of metal or other objects whereby portions of the surfaces thereof are changed in characteristic relatively to adjacent portions.

The object of the invention is to effect a local heating of an object to change its characteristics in a simple, effective, and relatively inexpensive way. Another object of the invention is to cool the object, after heating, in a manner to secure uniformity of characteristics in the surface treated.

The objects are accomplished by a process by which portions of an object, such as the surface forming the seat of a valve, are subjected to an intense heat for a short period of time, by placing the object in the zone of an intense heat, such as an electric arc or an acetylene torch, and relatively rotating the object and the heat-producing means so rapidly that the entire surface or zone to be treated is uniformly heated to the desired temperature without permitting adjacent surfaces of the object to become affected by the heat to a substantial extent, and afterwards quenching the same, preferably by rotating the object in a quenching bath.

The process is applicable to many objects and may be carried out by varied mechanisms and by the employment of various sources of heat. For the purposes of illustrating the principles involved I have chosen to disclose an apparatus for giving rapid rotation to the object to be treated and a source of heat which is movable in respect to the object.

In the accompanying drawings:

Fig. 1 is a side elevation of an apparatus suitable to give rapid rotation to the object to be heat-treated, showing an acetylene torch as the source of heat.

Fig. 2 is a vertical section through the chuck adapted to hold the object while it is rotated, on an enlarged scale, taken on line II—II of Fig. 1.

Fig. 3 is a sectional view taken on line III—III of Fig. 2.

Figs. 4 and 5 show embodiments employing an electric arc as the source of heat, Fig. 4 showing two electrodes between which the arc is formed, and Fig. 5 showing an arrangement in which the object forms one of the electrodes.

Referring to the drawings in detail in which the same reference number is used throughout to designate the same part, a base 1 is provided with a standard 2 carrying a bracket 3 at its upper end which projects laterally therefrom to overlie a portion of the base 1. The bracket 3 has three outwardly projecting lugs or ears 4, 5 and 6 in which are formed bearings 7, 8 and 9 for a chuck assembly by which the object to be heat-treated is held and moved into the heating zone for treatment, and by which it may be moved into the quenching bath therebelow, rotated therein, and released. The chuck assembly consists of a sleeve 10 fitted for rotation in the bearing 9 and provided with a plurality of gripping jaws 11 at its lower end, biased so as normally to close upon the object to be treated, the jaws preferably being formed by slits 12 in the lower thickened walls of the sleeve.

Within the chuck sleeve 10 and secured non-rotatably but slidably with respect thereto by means of the spline 13, is a jaw-opening sleeve 14 having a frusto-conical lower end 15 engaging a similarly shaped recess 16 formed in the interior of the chuck-sleeve 10 in proximity to the upper ends of the slits 12. Rotatably mounted in the bearings 7 and 8 is a shaft 17 having its lower end extending into the jaw-opening sleeve 14 with which it has a splined connection 18 permitting relative longitudinal motion while preventing relative rotational movement thereof. Secured on the upper end of the jaw-opening sleeve 14 is a nut 19 provided with a circumferential groove 20 in which loosely fits a collar 21 provided with a laterally extending pin 22 engaged in the slot 23, of a hand lever 24, pivoted to the bracket 3 as indicated at 25 by which the jaw-opening sleeve 14 is moved longitudinally with respect to the chuck-sleeve 10. The upper end of the chuck-sleeve 10 is similarly connected by a nut 26 to a hand lever 27 pivoted at 28 to the bracket 3. The hand lever 27 is provided with a spring latch 29 adapted automatically to engage a notch 30 formed in a curved latch bar 31 secured at its opposite ends to lugs 5 and 6. The latch is connected to a thumb lever 32, pivoted to the end of hand lever 27. The end of the hand lever 24 is slightly offset so as to permit freedom in operating the hand lever 27 and the thumb lever 32 mounted thereon.

For giving rapid rotation to the chuck a pulley 33 is fixed to the shaft 17 between bearings 7 and 8 and is engaged by a belt 34 operated by an electric or other motor 35, the intermediate portion of the belt preferably being trained over idler pulleys 36 (only one of which is shown) mounted on bracket 37.

Immediately beneath the chuck, upon the base 1, is a quenching tank 38, adapted to contain water or other suitable quenching fluid, into which the article under treatment is plunged after it has been subjected to heat for a period of time sufficient to effect the result desired in any particular situation.

The source of heat employed is preferably an acetylene torch or an electric arc, but any other source which provides an intense heat and is adapted for application to surfaces of limited area may be used. In Fig. 1 I have illustrated an acetylene torch of well known form, adapted to be held in the hand of an operator and moved to any desired position with respect to the object under treatment.

In Figs. 4 and 5 I have illustrated an electric arc as the source of heat, Fig. 4 showing an embodiment in which two electrodes are employed, and Fig. 5 showing an embodiment in which the article undergoing treatment forms one of the electrodes. Such constructions are parts of electric welding outfits well known to the art, requiring no detailed description. Where the object to be treated forms one of the electrodes one of the circuit wires will be connected with the chuck so as to cause the current to pass through the object, suitable insulation being employed to prevent short-circuiting or grounding of the circuit.

Operation.—Assuming that the article to be heat-treated is a valve the operation is as follows: It should be observed that when the chuck jaws are in clutching relation, the nuts 19 and 26 on the upper ends of the jaw-opening sleeve and chuck sleeve, respectively, are slightly separated, the conical lower end of the jaw-opening sleeve lying in the upper part of the conical recess 16 in the chuck sleeve 10. In order to open the jaws of the chuck, the operator lifts the hand lever 27. During the first part of the movement the resistance of the jaws to spreading movement will be sufficient to carry upward the jaw-opening sleeve 14, the nuts 19, 26 retaining their separated relation. When the nut 19 abuts against the bearing 8 further motion of the hand lever causes relative motion of the sleeves 10 and 14, thereby causing the lower end of the sleeve 14 to be thrust toward the lower end of the conical recess 16 whereby the chuck jaws are spread apart to receive the stem of the valve. Upon reverse motion the jaws grasp the stem of the valve which is then moved to bring the part to be treated into proximity to the source of heat into which it is projected while rotating at a high rate of speed. Assuming that it is desired to harden that surface of a valve head which forms the valve seat, such surface will be brought to a position where the acetylene flame or electric arc may be projected upon its limited surface. It is then continued in rotation until the part is heated over the desired surface and to the desired depth, which may be determined by the eye of a skilled operator. When the desired point has been reached the latch 29 is released and the valve head is quickly lowered, while still rotating at a high speed, into the quenching bath as indicated in dotted lines in Fig. 1. After rotating in the bath for a short period of time, the hand lever 24 is pressed toward hand lever 27 causing the jaws of the chuck to open and release the valve. This operation is repeated for other objects preferably without stopping the rotation of the chuck.

It is old in the art to rotate a part to be heat-treated while subjecting the same to an intense heat, such as an electric arc, but in the prior practice the required heat was obtained by a single contact of the surface and heating means. Such a process and an apparatus for carrying it out are disclosed in the patent to Patten No. 1,112,087, dated Feb. 29, 1914. According to the disclosure of the patent an electric arc and a cylindrical surface to be treated are rotated and simultaneously moved longitudinally with respect to each other, thereby subjecting helical zones of the object to intense heat, a current of cooling gas following the arc for quenching purposes. By such practice those portions of the object which are neighbors to the zone of the most intense heat, whether located forwardly, backwardly or laterally thereof, are also heated to a temperature ranging between the maximum temperature and atmospheric. In this process each point of the surface treated receives the maximum heat but once and is immediately quenched.

According to my process each element of the surface treated receives the maximum heat a plurality of times until the entire surface has been gradually and uniformly brought to the desired temperature, and is then quenched. In the treatment of an object like a valve seat having sharp edges, such edges, being thin, will heat much more quickly than the plane surface. If such an object were held in the intense heat of an electric arc or acetylene torch the temperature would rise almost instantly to melting point, so that it is impractical to bring any point of such surface to a desired temperature by a single application of such intense heat within anywhere near the desired or required limits. Furthermore, if such an object were subjected to the maximum heat at one spot before treating the adjacent portion, the edges would be overheated when the plane face reached the proper temperature. By rapidly rotating the object and bringing the entire surface to be treated uniformly to heat, and by employing a manually manipulable source of heat, I may give to such surface a uniform heat to any desired temperature, within small limits, as the source of heat may be applied at any desired point and to any desired extent by moving the flame closer to or further away from the object, or directing it at any desired angle. The desired temperature is readily determined by observation of a skilled operator who may apply the heat at any point and to any extent, and bring the part to the desired heat at all points.

It is well known that an acetylene torch or electric arc has an oxidizing zone and a non-oxidizing zone. The oxidizing zone produces scale which must be removed in the finishing operation. By partially employing the non-oxidizing zone, I may reduce the amount of scale ordinarily incident to heat-treatment and consequently the cost of the finishing operation, or by employing it exclusively I may heat-treat finished surfaces without the necessity of any additional finishing operation, which is a feature of great importance.

Furthermore, by rapidly rotating the object the depth to which the object is heated may be quite accurately controlled since the amount of heat received by an element of the surface at any time is not sufficient to permit of its being conducted to the interior except in slight degree.

The factor which determines the rapidity of rotation of the object is the allowable tolerance from the desired temperature. For example, if it is desired to harden the seat of a valve, to effect which it should be calculated that the temperature must be raised to not less than 1500° F., the desired temperature would be 1525° F., with an allowable tolerance of 25° F. To effect such a heat the object would be rotated at a speed such that the decrease in temperature, during one revolution of any point touched by the heating means, would be less than 25° F. The time during which rotation would have to be continued would then be governed by the increase in temperature during one revolution, but, as above stated, this period is determined from observation by the skilled operator. I have found that, when using an acetylene torch operating on a valve head of 1⅞" diameter rotating at a speed of about 1500 R. P. M., the valve seat may be heated to a temperature of 1525° F. to a depth of ⅜" in about nineteen seconds.

It is of course old to quench by a bath of water or other liquid, but the old method results in irregular cooling and consequently in soft spots, which are often a source of serious trouble, particularly in valves. If a valve, after treatment as above described, were simply dropped into the bath, it would at once pass to the bottom where a part of the valve head would rest upon the bottom of the tank or upon one of the previously treated valves before it was sufficiently cooled by the bath. The spot which rested upon the bottom of the tank or upon another valve would be cooled at a different rate than the remainder and the part would thus lack uniformity in hardness. By rotating the part in the quenching bath I have found that it is uniformly tempered, the reason for which is that fresh liquid is brought into contact with the heated parts, and steam pockets are prevented, thus effecting more rapid and uniform cooling.

While I have described specific apparatus to carry out my process it is obvious that the apparatus may be varied in many particulars. It is, therefore, to be understood that my invention is not to be confined to the apparatus described, or to the precise procedure disclosed, but that it includes all changes or variations comprehended within the terms of the appended claims.

What I claim is:

1. In the process of heat treating internal combustion engine valves, the said valves comprising a stem and a head having a valve seat portion, the steps of rotating the valve at high speed, and applying intense heat to a portion of the rotating valve seat surface and continuing rotation of the valve until the valve seat portion of the valve has reached the required temperature.

2. In the process of heat treating internal combustion engine valves, the said valves comprising a stem and a head having a valve seat portion, the steps of rotating the valve at high speed, and applying intense heat to a portion of the rotating valve seat surface and continuing rotation of the valve until the valve seat portion of the valve has reached the required temperature, and then immediately quenching the heated portion of the valve while it is still rotating.

Signed by me this 23 day of July, 1926.

RICHARD E. BISSELL.